United States Patent [19]

Patel

[11] Patent Number: 5,985,800
[45] Date of Patent: *Nov. 16, 1999

[54] INVERT EMULSION FLUIDS SUITABLE FOR DRILLING

[75] Inventor: Arvind D. Patel, Houston, Tex.

[73] Assignee: M-I L.L.C., Houston, Tex.

[*] Notice: This patent is subject to a terminal disclaimer.

[21] Appl. No.: 09/043,868

[22] PCT Filed: Aug. 1, 1997

[86] PCT No.: PCT/US97/13883

§ 371 Date: Mar. 20, 1998

§ 102(e) Date: Mar. 20, 1998

[87] PCT Pub. No.: WO98/05735

PCT Pub. Date: Feb. 12, 1998

Related U.S. Application Data

[63] Continuation of application No. 08/862,198, May 23, 1997, Pat. No. 5,905,061
[60] Provisional application No. 60/023,043, Aug. 2, 1996, abandoned.

[51] Int. Cl.⁶ .............. C09K 7/06; C09K 7/02; B01J 13/00
[52] U.S. Cl. .......... 507/129; 507/140; 507/145; 516/27; 516/141
[58] Field of Search ............ 516/27, 141; 507/129, 507/140, 145

[56] References Cited

U.S. PATENT DOCUMENTS

| | | | |
|---|---|---|---|
| 2,802,531 | 8/1957 | Cardwell et al. | 166/42 |
| 2,900,336 | 8/1959 | Brown et al. | 507/129 |
| 2,900,337 | 8/1959 | Earley et al. | 252/8.5 |
| 3,804,760 | 4/1974 | Darley | 252/8.55 |
| 3,962,151 | 6/1976 | Dekker et al. | 252/548 |
| 4,040,866 | 8/1977 | Mondshine | 134/26 |
| 4,230,586 | 10/1980 | Bretz et al. | 252/8.5 |
| 4,439,345 | 3/1984 | Duke | 516/141 |
| 4,582,543 | 4/1986 | Bretz | 148/250 |
| 4,615,813 | 10/1986 | Bretz | 252/8.514 |
| 4,645,608 | 2/1987 | Rayborn | 252/8.51 |
| 4,670,550 | 6/1987 | Bleeker et al. | 536/114 |
| 4,735,731 | 4/1988 | Rose et al. | 252/8.51 |
| 5,156,686 | 10/1992 | Van Slyke | 134/26 |
| 5,189,012 | 2/1993 | Patel et al. | 507/103 |
| 5,254,531 | 10/1993 | Mueller et al. | 507/131 |
| 5,403,820 | 4/1995 | Walker | 507/110 |
| 5,634,984 | 6/1997 | Van Slyke | 134/40 |

FOREIGN PATENT DOCUMENTS

| | | | |
|---|---|---|---|
| 2068129 | 7/1992 | Canada | C09K 5/00 |
| 0137538A2 | 4/1985 | European Pat. Off. | C90K 7/06 |
| 0226250A2 | 6/1987 | European Pat. Off. | C08J 3/08 |
| 0271943A2 | 6/1988 | European Pat. Off. | C09K 7/02 |
| 0382070A1 | 9/1989 | European Pat. Off. | C09K 7/06 |
| 0386636A1 | 3/1990 | European Pat. Off. | . |
| 0382318A1 | 8/1990 | European Pat. Off. | B01F 17/16 |
| 2462436A1 | 2/1977 | Germany | C10M 3/30 |
| 3903784A1 | 6/1990 | Germany | . |
| 2195685A | 12/1988 | United Kingdom | C09K 7/06 |
| WO87/02692 | 5/1987 | WIPO | C09K 7/00 |
| WO92/22622 | 12/1992 | WIPO | C09K 7/06 |
| WO93/16145 | 8/1993 | WIPO | C09K 7/06 |
| WO95/17244 | 6/1995 | WIPO | B01F 17/00 |

OTHER PUBLICATIONS

Kirk–Othmer, "Encyclopedia of Chemical Technology", Third Edition, vol. 1, A to Alkanolamines, pp. 944–960, 1978.

"Fine and Functional Chemicals", Nitrogen Derivatives, AKZO General Catalog. Copyright 1990.

"Quaternary Ammonium Compounds", Fine and Functional Chemicals, AKZO Catalog. Copyright 1990.

*Primary Examiner*—Philip Tucker
*Attorney, Agent, or Firm*—Arnold White & Durkee

[57] ABSTRACT

New drilling fluids have been invented which are invert emulsion fluids comprising an oleaginous liquid, a non-oleaginous liquid, and a protonated amine. Such fluids are acidic and thus useful in drilling wells in which acidic gases such as $CO_2$ or $H_2S$ are likely to be encountered and break, i.e. de-emulsify, the drilling fluid.

11 Claims, No Drawings

INVERT EMULSION FLUIDS SUITABLE FOR DRILLING

This is the U.S. National Phase of International Patent Application No.: PCT/US97/13883; filed Aug. 1, 1997 which claims priority of then co-pending U.S. Provisional Application No.: 60/023,043, filed Aug. 02, 1996 now abandoned and also is a continuation-in part of U.S. Utility Patent Application No.: 08/862,198, filed May 23, 1997, now U.S. Pat. No. 5,905,061.

FIELD OF THE INVENTION

This invention relates to invert emulsion fluids suitable for use in drilling wells. More particularly, the invention relates to acidic drilling fluids comprising an oleaginous liquid, a non-oleaginous liquid, an amine and an acid.

BACKGROUND OF THE INVENTION

Invert emulsion fluids. i.e. emulsions in which the non-oleaginous fluid is the dispersed phase and the oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and downhole, and penetrating salt beds without sloughing or enlargement of the drilled hole.

Invert emulsion fluids generally consist of a three-component system, namely an oleaginous liquid such as oil which serves as a continuous phase, a non-oleaginous liquid such as water which serves as a discontinuous phase, and an emulsifying agent. The emulsifying agent serves to lower the interfacial tension of the liquids so that the non-oleaginous liquid may form a stable dispersion of fine droplets in the oleaginous liquid. A full description of such invert emulsions may be found in *Composition and Properties of Drilling and Completion Fluids,* 5th Edition, H. C. H. Darley, George R. Gray, Gulf Publishing Company, 1988. pp. 328–332, the contents of which are hereby incorporated by reference.

Usually, lime or other alkaline materials are added to conventional invert emulsion fluids to maintain a reserve alkalinity when the invert emulsion fluid is to be used in drilling. See, for example, API Bulletin RP 13B-2, 1990. p. 22 which describes a standard test for determining excess lime in drilling mud. See also, for example, U.S. Pat. No. 5,254,531 which employs lime along with an ester oil, a fatty acid, and an amine and EP 271943 which employs lime along with oil, water, and an ethoxylated amine. In some areas acidic gases such as $CO_2$ or $H_2S$ are encountered during drilling. The acidic gases often weaken conventional invert emulsion fluids to the point of failure and render the invert emulsion fluids unstable.

Another aspect of invert emulsions that is typically encountered during drilling is the need to increase the density of the drilling fluid. Conventionally this is done by the addition of solid weighting agents or by the use of brines of salts that form basic or neutral aqueous solutions. The use of brines of salts that form acidic aqueous solutions, for example a transition metal halide solution, is difficult because of the addition of the acidic brine would tend to make the invert emulsion fluids unstable. Further, due to the alkaline reserve noted above, the transition metal ion would precipitate out due to the formation of hydroxide complexes. However the use of acidic brine solutions is desired due to their higher density imparted by the metal cation.

Thus, it would be desirable if an invert emulsion could be invented which did not fail or weaken when subjected to acidic gases such as $CO_2$ or $H_2S$. Likewise, it would be desirable to weight an oil based drilling fluid with high density acidic brines which may be made with acidic metal salts. In this manner, the invert emulsion could be employed as a stable drilling or completion fluid.

SUMMARY OF THE INVENTION

A new invert emulsion fluid has been invented which comprises an oleaginous liquid, a non-oleaginous liquid, and a protonated amine having the structure $R-N^+-H_3$ wherein R represents a $C_{12}-C_{22}$ alkyl group or a $C_{12}-C_{22}$ alkenyl group. Such fluid is particularly useful in the drilling of wells in which $CO_2$, $H_2S$ or other acidic gases will be encountered and break or adversely affect conventional invert emulsions. Such fluids may also be useful in the formulation of "solids free" invert emulsion drilling fluids with an acidic brine internal phase.

DETAILED DESCRIPTION OF THE INVENTION

As used herein, the term "invert emulsion" is an emulsion in which a non-oleaginous fluid is the dispersed phase and an oleaginous fluid is the continuous phase. The novel invert emulsion fluids of the present invention are useful in a similar manner as conventional invert emulsion fluids which includes utility in preparation for drilling, drilling, completing and working over subterranean wells such as oil and gas wells. Such methods of use of conventional inverse emulsion fluids are described in, for example. *Composition and Properties of Drilling and Completion Fluids,* 5th Edition, H. C. H. Darley, George R. Gray. Gulf Publishing Company. 1988, the contents which are incorporated by reference, as well as. U.S. Pat. No. 5,254,531 and EP 271943 which are incorporated by reference. One advantage of the instant invert emulsion fluids is that due to the protonation of the amine it will normally not be necessary to add significant amounts of lime or another basic material to the invert emulsion fluid when an acidic substance such as $CO_2$ or $H_2S$ comes into contact with the fluid. Another advantage of the invert emulsion fluids of the present invention is that brines including acidic transition metal salts may be used to increase the density of the drilling fluid without the addition of solids or the formation of undesirable metal hydroxide precipitates.

As used herein, the term "oleaginous liquid" means an oil which is a liquid at 25° C. and immiscible with water. Oleaginous liquids typically include substances such as diesel oil, mineral oil, synthetic oil, glycerides of fatty acids, aliphatic esters, aliphatic ethers, aliphatic acetal, dialkylcarbonates, or other such hydrocarbons or mixtures of compounds that are typically used in the drilling art.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25° C. and which is not an oleaginous liquid as defined above. Non-oleaginous liquids are immiscible with oleaginous liquids but capable of forming emulsions therewith. Typical non-oleaginous liquids include aqueous substances such as sea water or brine containing inorganic or organic dissolved salts, as well as, water-miscible organic compounds.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

As used herein, the term "amine" refers to compounds having the structure R—$NH_2$ wherein R represents a $C_{12}$–$C_{22}$ alkyl group, a $C_{12}$–$C_{22}$ alkenyl group, a $C_3$–$C_8$ cycloalkyl group substituted with a $C_9$–$C_{14}$ alkyl or alkenyl group, or a $C_9$–$C_{14}$ alkyl or alkenyl group substituted with a $C_3$–$C_8$ cycloalkyl group. Preferable R groups include straight or branched dodecyl, tridecyl, tetradecyl, pentadecyl, hexadecyl, heptadecyl, octadecyl, nodecyl, eicosyl, heneicosyl, docosyl, as well as, mixtures and unsaturated derivatives thereof. Preferable unsaturated derivatives include soyaalkylamine (Armeen S™ available from Akzo Chemicals Inc.) and tallowalkylamine (Armeen T™ available from Akzo Chemicals Inc.). Many of the other above amines are also commercially available from Akzo Chemicals Inc. under the tradename Armeen™. The aforementioned amines of the formula R—$NH_2$ are protonated for use in the invention. The term "protonated" means that the amine is converted to the structure R—$N^+$—$H_3$ $X^-$. Typically, such protonation occurs due to reaction of the amine with a water-soluble acid as discussed below. Generally, the type of counter-ion, X-, is not particularly critical so long as it does not adversely affect the performance and characteristics of the resulting emulsion as is disclosed herein. Examples of the counter-ion include the conjugate bases of the acids described below.

The amine, when protonated, functions in the instant invention as a surfactant to lower the interfacial tension of the liquids so that the non-oleaginous liquid may form a stable dispersion of fine droplets in the oleaginous liquid. Therefore, the amount of amine should be sufficient to enable the non-oleaginous liquid to form a stable dispersion of fine droplets in the oleaginous liquid. While this amount may vary depending upon the nature and amount of the oleaginous liquid and non-oleaginous liquid, typically the amount of amine is at least about 0.1, preferably at least about 5, more preferably at least about 10 percent by weight of the total fluid. Correspondingly, the amount should not be so great that the amine interferes with the stability of the invert emulsion fluid or the performance of the invert emulsion as a drilling fluid.

As used herein, the term "acid" refers to water-soluble, i.e. at least 10 percent by volume of the acid dissolves in water, compounds which form "acidic solutions". A solution is considered to be an "acidic solution" if it is capable of protonating the amine and render a stable non-oleaginous fluid in oleaginous fluid emulsion. The term acid refers to both inorganic acids such as sulfuric, nitric, hydrofluoric, hydrochloric and phosphoric acid and organic acids such as citric, acetic, formic, benzoic, salicyclic, oxalic, glycolic, lactic, glutaric acid, halogenated acetic acids, organosulfonic acids, organophosphoric acids and the like. Fatty acids such as oleic, palmitic, and stearic acid are not within the definition of acid as used herein because such acids are not water-soluble. Compounds that generate acidic solutions upon dissolution in water are also considered "acids" as the term is used herein. For example such acids may include, acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and similar such compounds. Thus in one embodiment, the acidic solution is formed by the dissolution of an acidic metal salt in water. That is to say the upon dissolution of the metal salt, a sufficient concentration of protons are produced the resulting solution is capable of protonating the amine and render a stable non-oleaginous fluid in oleaginous fluid emulsion. In another embodiment the acidic solution is a brine formed by the dissolution of a neutral metal salt and an acidic metal salt in water. In yet another embodiment, an acidic solution may be formed by the dissolution of a acid compound and a neutral salt.

In a particularly preferred embodiment of this invention, brines, such as zinc bromide brine or zinc bromide and calcium bromide brine, are acidic in aqueous solutions, and these brines are acidic enough to protonate the amines of this invention to form invert emulsions. Other transition metal salts may demonstrate utility in this invention, for instance zinc chloride, and related materials. One distinct advantage of the use of these materials is the ability to build weight in drilling fluids without adding solid weighting materials, such as those described below.

The amount of acid must be sufficient to protonate the amine without rendering the invert emulsion fluid so acidic that it is unstable. As one skilled in the art will appreciate, the amount of acid will necessarily vary tremendously with the strength of the acid and the particular amine to be protonated. Nevertheless, one skilled in the art having the benefit of this specification may readily determine the necessary amount of acid via routine experimentation.

The method of preparing the drilling fluids of the present invention is not particularly critical so long as an invert emulsion is formed. Generally, the components may be mixed together in any order under agitation condition. A representative method of preparing said invert emulsion fluids comprises mixing an appropriate quantity of oleaginous fluid and an appropriate quantity of amine together with continuous, mild agitation. An acidic non-oleaginous fluid or a non-oleaginous fluid in combination with an acid is then added while mixing until an invert emulsion is formed. If solid weight material, such as those described below, are to be added, then the solid weight material is typically added after the invert emulsion fluid is formed.

One skilled in the art may readily identify whether the appropriate ingredients and amounts have been used to form an invert emulsion by using the following test:

INVERT EMULSION TEST

A small portion of the emulsion is placed in a beaker which contains an oleaginous fluid. If the emulsion is an invert emulsion, the small portion of the emulsion will disperse in the oleaginous fluid. Visual inspection will determine if it has so dispersed. Alternatively, the electrical stability of the invert emulsion may be tested using a typical emulsion stability tester. Generally the voltage applied across two electrodes is increased until the emulsion breaks and a surge of current flows between the two electrodes. The voltage required to break the emulsion is a common measure of the stability of such an emulsion. Other tests are described on page 166 of the book, *Composition and Properties of Drilling and Completion Fluids*, 5th Edition, H. C. H. Darley and George Gray, Gulf Publishing Company, 1988, the contents of which are hereby incorporated by reference.

Various surfactants and wetting agents conventionally used in invert emulsion fluids may optionally be incorporated in the fluids of this invention. Such surfactants are, for example, fatty acids, soaps of fatty acids, amido amines, polyamides, polyamines, oleate esters, imidazoline derivatives, oxidized crude tall oil, organic phosphate esters, alkyl aromatic sulfates and sulfonates, as well as, mixtures of the above. Generally, such surfactants are employed in an amount which does not interfere with the fluids of this invention being used as drilling fluids.

Viscosifying agents, for example, organophilic clays, may optionally be employed in the invert drilling fluid compositions of the present invention. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight of the total fluid. VG-69™ and VG-PLUS™ are organoclay materials and Versa HRP™ is a polyamide resin material manufactured and distributed by M-I Drilling Fluids Company which are suitable viscosifying agents.

Fluid loss control agents such as modified lignite, polymers, oxidized asphalt and gilsonite may also be added to the invert drilling fluids of this invention. Usually such fluid loss control agents are employed in an amount which is at least about 0.1, preferably at least about 1, more preferably at least about 5 percent by weight of the total fluid.

The invert emulsion drilling fluids of this invention may optionally contain a solid weight material. The quantity and nature of the solid weight material depends upon the desired density and viscosity of the final composition. The preferred solid weight materials include, but are not limited to, barite, iron oxides, calcium carbonate and the like. The solid weight material is typically added in order to obtain a drilling fluid density of less than 24, preferably less than 21, and most preferably less than 19.5 pounds per gallon.

The invert emulsion drilling fluids of the present invention may also be weighted by the use of acidic metal salt brines. Like solid weight materials, the quantity and nature of the acidic metal salt brine depends upon the desired density and viscosity of the final composition. As noted above, acidic metal salt brines may be formed by the dissolution of an acidic metal salt in aqueous solution with or without other acids. The preferred acidic metal salts are transition metal salts of neutral or acid anions. For example, such anions include halide, sulfate, sulfite, nitrate, hyrdosulfate and the like. In one such embodiment, the acidic metal salt is selected from the group including zinc chloride, zinc bromide, the hydrates of these salts, and their mixtures. In another preferred embodiment the acidic metal salt is zinc bromide. Yet a third embodiment includes a mixture of—neutral salt, such as calcium halide, or alkali metal halide, nitrate or sulfate, and an acidic metal salt is selected from the group including zinc chloride, zinc bromide, the hydrates of these salts, and their mixtures. Thus in one embodiment a mixture of zinc bromide and calcium bromide is used to generate a brine solution. Depending upon the increase in density desired, the concentration of the salt in solution can be varied. In one such embodiment a mixture of zinc bromide and calcium bromide is used to achieve a solution having a density of 19.2 pounds per gallon. One skilled in the art should readily be able to formulate any such solution. One method of doing this is to form a saturated aqueous solution of the selected salt or mixture of salts and measuring the density of the decanted solids free solution. The density of the saturated salt solution can be lowered by systematically diluting with small portions of water until the desired density is obtained. If a higher density solution is desired, a more soluble form of the metal salt may be selected or a combination of salts may be utilized. It should be noted that in some cases environmental concerns regarding the toxicity of the metal ion in solution should be considered when selecting the salt to be used to form the brine.

The following examples are submitted for the purpose of illustrating the performance characteristics of the drilling fluid compositions of this invention. These tests were conducted substantially in accordance with the procedures in API Bulletin RP 13B-2, 1990 which is incorporated herein by reference. The following abbreviations may be used in describing the results of experimentation:

"E.S." is electrical stability of the emulsion as measured by the test described in *Composition and Properties of Drilling and Completion* Fluids, 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft2).

"AV" is apparent viscosity which is another variable used in the calculation of viscosity characteristic of drilling fluid, measured in centipoise (cp) units.

"GELS" is a measure of the suspending characteristics, or the thixotropic properties of a drilling fluid, measured in pounds per 100 square feet (lb/100 ft2).

"API F.L." is the term used for API filtrate loss in milliliters (ml).

"HTHP" is the term used for high temperature high pressure fluid loss, measured in milliliters (ml) according to API bulletin RP 13 B-2, 1990.

EXAMPLE 1

In the following example invert drilling fluids are prepared utilizing amines of this invention.

| Formulation 1 | |
|---|---|
| Materials | Amount in Grams |
| I.O. $C_{16}$–$C_{18}$ ™ Oil (Isomerized olefin available from Amoco) | 125 |
| Lime | 0 |
| Organophilic clay (VG-PLUS ™ available from M-I Drilling Fluids) | 2.0 |

-continued

Formulation 1

| Materials | Amount in Grams |
|---|---|
| Adogen - 151 ™ (Tall Oil Primary amine available from Witco Chemical Company) | 10 |
| 25% CaCl$_2$ Brine | 90 |
| CaCO$_3$ | 293 |

The above formulation was prepared according to the following procedure: First, oil and organophilic clay were mixed in a glass jar on a Hamilton Beach mixer for 15 minutes. Then Adogen-151™ was added and mixed for 10 minutes. Brine was then added and mixed for 15 minutes. CaCO$_3$ was then added and mixed for 15 minutes.

The above formulation was heat aged at 150° for 16 hours. Initial and heat aged properties were measured at room temperature.

| | Initial | Heat Aged |
|---|---|---|
| E.S. | 343 | 378 |
| P.V. | 54 | 41 |
| Y.P. | 23 | 40 |
| GELS | | |
| 10 sec. | 13 | 18 |
| 10 min. | 14 | 20 |

5.0 grams of lime were added to the heat-aged formulation and heated at 150° F. The invert emulsion broke in 4 hours and the solids were water-wet. Electrical stability (E.S.) dropped to 6.

To the above water-wet solids formulation, 15 ml of 17.5% hydrochloric acid were added. The formulation was mixed for 10 min. The water-wet solids became oil-wet and an invert emulsion was obtained. The emulsion stability increased to 280. The following properties were measured on the acid treated formulation.

| E.S. | 280 |
|---|---|
| P.V. | 50 |
| Y.P. | 20 |
| GELS | |
| 10 sec. | 6 |
| 10 min. | 9 |

5.0 g of lime were added to the acid treated formulation above and mixed for 10 min. The formulation was then heat aged at 150° F. for six hours. It was then noted that the emulsion broke and the solids became water-wet. The fluid had an electrical stability of 6.

To the above water-wet solids mixture, 10 ml of glacial acetic acid were added. The water-wet solids became oil-wet again. The electrical stability increased to 295.

The above example shows that the protonation of the amine makes the invert emulsion and upon deprotonation, the emulsion is broken.

EXAMPLE 2

The following formulation was prepared to demonstrate the utility of amine surfactant of this invention in 50/50 oil to water ratio oil base mud.

Formulation 2

| Materials | Amount in Grams |
|---|---|
| I.O. C$_{16}$–C$_{18}$ ™ | 121 |
| VG-PLUS ™ | 2.0 |
| Adogen - 151 ™ | 12.0 |
| 25% CaCl$_2$ Brine | 200 |
| CaCO$_3$ | 61 |

The above formulation was prepared in a manner similar to Example 1 and heat aged at 150° F. for 16 hours. The following initial and heat-aged properties were measured.

| | Initial | Heat Aged |
|---|---|---|
| E.S. | 156 | 150 |
| P.V. | 34 | 37 |
| Y.P. | 38 | 43 |
| GELS | | |
| 10 sec | 18 | 20 |
| 10 min | 18 | 22 |

5.0 g lime was then added to the above formulation and it was heat-aged to 150° F. for 4 hours. The solids became water-wet. The electrical stability was 6.

15.0 ml. of 17.5% hydrochloric acid were then added to the water-wet formulation above and mixed for 10 min. The water-wet solids became oil-wet. The electrical stability increased to 208. The mud was oil dispersible.

The above example shows that the protonation of amine-surfactant of this invention makes stable water-in-oil emulsions.

EXAMPLE 3

The following formulation was prepared in a manner similar to Example 1 to demonstrate the use of amine surfactant in protonated form to make stable water-in-oil emulsions.

Formulation 3

| Materials | Amount in Grams |
|---|---|
| I.O. C$_{16}$–C$_{18}$ ™ | 12.1 |
| VG-PLUS ™ | 2.0 |
| Jet-amine-PS ™ (primary soya available from Jetco Chemical) | 12.0 |
| 17.5% HCl | 10.0 |
| 25% CaCl$_2$ Brine | 190 |
| CaCO$_3$ | 61 |

The above formulation was heat-aged at 150° F. for 16 hours. The following properties were measured after heat-aging.

| E.S. | 216 |
|---|---|
| P.V. | 39 |
| Y.P. | 51 |
| GELS | |
| 10 sec | 22 |
| 10 min | 23 |

10 g of lime were mixed with the above formulation and the resulting formulation was heat-aged at 150° F. for 5 hours.

The emulsion was converted to an oil-in-water emulsion with electrical stability of 10. The following properties were measured on this oil-in-water emulsion

|      |    |
| ---- | -- |
| E.S. | 10 |
| P.V. | 20 |
| Y.P. | 18 |
| GELS |    |
| 10 sec | 6 |
| 10 min | 13 |

15 ml of 17.5% hydrochloric acid was then mixed with the above formulation and it was converted to an oil-base mud with electrical stability 153.

The above example establishes that the amine emulsifier in protonated form of this invention forms a water-in-oil emulsion. Upon deprotonating with lime, it forms an oil-in-water emulsion.

EXAMPLE 4

The following formulations, Formulations 4, Formulation 5 and Formulation 6, were prepared in a manner similar to Example 1 to demonstrate the use of synthetic oils in preparing invert emulsions of this invention.

| Materials | Formulation 4 Amount in Grams | Formulation 5 Amount in Grams | Formulation 6 Amount in Grams |
| --- | --- | --- | --- |
| Sarapar ™ - 147 (oil from Shell Oil) | 121 | 121 | 21 |
| VG-PLUS ™ | 2.0 | 2.0 | 2.0 |
| Emulsifiers | Jet-Amine P.T. ™ (Primary Tallow amine from Jetco Chemical) | Jet-Amine P.S. ™ (Primary Soya amine from Jetco Chemical) | Adogen - 151 ™ (Tall Oil Primary amine) |
|  | 12.0 | 12.0 | 12.0 |
| 17.5% HCl | 10 | 10 | 10 |
| 25% CaCl$_2$ | 200 | 200 | 200 |
| Barite | 66 | 66 | 66 |

The following initial properties were measured on the above formulations.

|      | Formulation 4 | Formulation 5 | Formulation 6 |
| ---- | ---- | ---- | ---- |
| E.S. | 159 | 160 | 125 |
| P.V. | 34 | 27 | 24 |
| Y.P. | 73 | 44 | 14 |
| GELS |     |     |     |
| 10 sec | 28 | 14 | 7 |
| 10 min | 34 | 20 | 8 |

The above formulations were then heat-aged at 150° F. for 16 hours. The following properties were then measured at room temperature.

|      | Formulation 4 | Formulation 5 | Formulation 6 |
| ---- | ---- | ---- | ---- |
| E.S. | 258 | 188 | 105 |
| P.V. | 29 | 26 | 21 |
| Y.P. | 36 | 36 | 15 |

|      | Formulation 4 | Formulation 5 | Formulation 6 |
| ---- | ---- | ---- | ---- |
| GELS |     |     |     |
| 10 sec | 18 | 18 | 7 |
| 10 min | 26 | 19 | 9 |

10 grams of lime were added to each of the above heat aged Formulations 4–6. The solids became water-wet. Electrical stability dropped to 25, 22 and 10 respectively. The water-in-oil emulsions were broken.

Glacial acetic acid was then added to each of the above water-wet solids mix to neutralize the lime and protonate the amine surfactant. Upon protonating the amine surfactant, the formulations became water-in-oil invert emulsions. Electrical stability increased to 121, 138 and 110, respectively.

The above example demonstrates the use of amine surfactant in protonated form to make the invert emulsion of this invention.

EXAMPLE 5

The following formulations were prepared to demonstrate the utility of the amine surfactant of this invention in preparing solids free invert emulsions using zinc bromide brine as internal phase.

| Materials | Formulation 7 (gm) | Formulation 8 (gm) | Formulation 9 (gm) | Formulation 10 (gm) |
| --- | --- | --- | --- | --- |
| I.O. C$_{16}$–C$_{18}$ ™ | 120 | 108 | 84 | 60 |
| Adogen-151 ™ | 12.0 | 12.0 | 15.0 | 15.0 |
| ZnBr$_2$ brine (19.2 ppg) | 345 | 379 | 448 | 517 |

The density of the zinc bromide brine solution was adjusted to achieve the desired density by either adding additional salt to increase the density or adding additional water to decrease the density. The above formulations were prepared in a manner similar to Example 1 and heat aged at 150° F. for 16 hours. The following heat aged properties were measured at room temperature.

|      | Formation 7 | Formation 8 | Formation 9 | Formation 10 |
| ---- | ---- | ---- | ---- | ---- |
| ES   | 306 | 352 | 205 | 175 |
| PV   | 18 | 22 | 32 | 101 |
| YP   | 8 | 8 | 17 | 69 |
| GELS |   |   |   |    |
| 10 sec | 3 | 4 | 6 | 19 |
| 10 min | 7 | 5 | 7 | 26 |

The above example demonstrates the use of a acidic metal salt brine (i.e. zinc bromide brine) with the amine surfactant in a protonated form to make an invert emulsion of this invention which is weighted (i.e. has a density greater than the emulsion when water replaces the brine) but does not contain solid weight materials.

While the compositions and methods of this invention have been described in terms of preferred embodiments it will be apparent to those of skill in the art that variations may be applied to the processes and compositions described herein without departing from the concept, spirit and scope of the invention. All such similar substitutes and modifications apparent to those skilled in the art are deemed to be within the spirit, scope and concept of the invention as set out in the following claims.

I claim:

1. An invert emulsion fluid comprising:
   a) an oleaginous liquid;
   b) a non-oleaginous liquid and wherein said non-oleaginous liquid is an acidic metal salt brine, said brine being in sufficient quantities to increase the density of the fluids; and
   c) a protonated amine having the structure

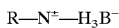

wherein R is a $C_{12}$–$C_{22}$ alkyl group or a $C_{12}$–$C_{22}$ alkenyl group and $B^-$ is the conjugate base of a water soluble acid.

2. An invert emulsion fluid comprising:
   a) an oleaginous liquid;
   b) a non-oleaginous liquid, wherein said non-oleaginous liquid is a brine including an acidic metal salt, said acidic metal salt being selected from the group consisting of zinc bromide, zinc chloride, the hydrates of these salts and mixtures thereof; and
   c) a protonated amine having the structure

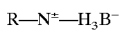

wherein R is a $C_{12}$–$C_{22}$ alkyl group or a $C_{12}$–$C_{22}$ alkenyl group and $B^-$ is the conjugate base of a water soluble acid.

3. An invert emulsion fluid comprising:
   a) an oleaginous liquid;
   b) a non-oleaginous liquid, wherein said non-oleaginous fluid is a brine including zinc bromide; and
   c) a protonated amine having the structure

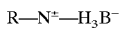

wherein R is a $C_{12}$–$C_{22}$ alkyl group or a $C_{12}$–$C_{22}$ alkenyl group and $B^-$ is the conjugate base of a water soluble acid.

4. A method of converting a water-in-oil emulsion fluid to an oil-in-water emulsion fluid, said method comprising:
   formulating a water-in-oil emulsion fluid, said water-in-oil emulsion fluid comprising: an oleaginous liquid; a non-oleaginous liquid; and a protonated amine having the structure

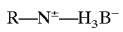

wherein R is a $C_{12}$–$C_{22}$ alkyl group or a $C_{12}$–$C_{22}$ alkenyl group, and $B^-$ is the conjugate base of a water soluble acid; and
   reacting said water-in-oil emulsion with a sufficient amount of a deprotonating agent so as to deprotonate said amine and thus forming an oil-in-water emulsion fluid.

5. The method of claim 4 wherein said deprotonating agent in a source of hydroxide ions in water.

6. An invert emulsion fluid comprising:
   a) an oleaginous liquid, said oleaginous liquid comprising from about 30 to about 99 percent by volume of said fluid;
   b) a non-oleaginous liquid, said non-oleaginous liquid comprising from about 1 to about 70 percent by volume of said fluid and wherein said non-oleaginous liquid is an acidic metal salt brine, said brine being in sufficient quantities to increase the density of the fluid; and
   c) a protonated amine having a structure of:

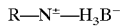

wherein R is a $C_{12}$–$C_{22}$ alkyl group or a $C_{12}$–$C_{22}$ alkenyl group and $B^-$ is the conjugate base of a water soluble acid, said protonated amine comprising from about 0.1 to 5.0 percent by weight of said fluid.

7. An invert emulsion fluid comprising:
   a) an oleaginous liquid, said oleaginous liquid comprising from about 30 to about 99 percent by volume of said fluid;
   b) a non-oleaginous liquid, said non-oleaginous liquid comprising from about 1 to about 70 percent by volume of said fluid and wherein said non-oleaginous liquid is a brine including an acidic metal salt, said acidic metal salt being selected from the group consisting of zinc bromide, zinc chloride, the hydrates of these salts and mixtures thereof; and
   c) a protonated amine having a structure of:

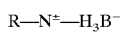

wherein R is a $C_{12}$–$C_{22}$ alkyl group or a $C_{12}$–$C_{22}$ alkenyl group and $B^-$ is the conjugate base of a water soluble acid, said protonated amine comprising from about 0.1 to 5.0 percent by weight of said fluid.

8. An invert emulsion fluid comprising:
   a) an oleaginous liquid, said oleaginous liquid comprising from about 30 to about 99 percent by volume of said fluid;
   b) a non-oleaginous liquid, said non-oleaginous liquid comprising from about 1 to about 70 percent by volume of said fluid and wherein said non-oleaginous fluid is a brine including zinc bromide; and
   c) a protonated amine having a structure of:

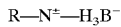

wherein R is a $C_{12}$–$C_{22}$ alkyl group or a $C_{12}$–$C_{22}$ alkenyl group and $B^-$ is the conjugate base of a water soluble acid, said protonated amine comprising from about 0.1 to 5.0 percent by weight of said fluid.

9. An invert emulsion fluid comprising:
   a) an oleaginous liquid selected from diesel oil, mineral oil, a synthetic oil, and a mixture thereof, said oleaginous liquid comprising from about 30 to about 99 percent by volume of said fluid;
   b) an aqueous non-oleaginous liquid comprising from about 1 to about 70 percent by volume of said fluid; wherein said non-oleaginous liquid is an acidic metal salt brine, said brine being in sufficient quantities to increase the density of the fluid and;
   c) a protonated amine having the structure:

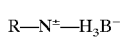

wherein R is a $C_{12}$–$C_{22}$ alkenyl group and $B^-$ is the conjugate base of a water soluble acid, said protonated amine comprising from about 0.1 to about 5.0 percent by weight of said fluid.

10. An invert emulsion fluid comprising:
a) an oleaginous liquid selected from diesel oil, mineral oil, a synthetic oil, and a mixture thereof, said oleaginous liquid comprising from about 30 to about 99 percent by volume of said fluid;
b) an aqueous non-oleaginous liquid comprising from about 1 to about 70 percent by volume of said fluid; wherein said non-oleaginous liquid is a brine including an acidic metal salt, said acidic metal salt being selected from the group consisting of zinc bromide, zinc chloride, the hydrates of these salts and mixtures thereof and;
c) a protonated amine having the structure:

$$R-N^{\pm}-H_3B^-$$

wherein R is a $C_{12}$–$C_{22}$ alkenyl group and $B^-$ is the conjugate base of a water soluble acid, said protonated amine comprising from about 0.1 to about 5.0 percent by weight of said fluid.

11. An invert emulsion fluid comprising:
a) an oleaginous liquid selected from diesel oil, mineral oil, a synthetic oil, and a mixture thereof, said oleaginous liquid comprising from about 30 to about 99 percent by volume of said fluid;
b) an aqueous non-oleaginous liquid selected from water, sea water, brine containing organic or inorganic salts dissolved therein, a liquid containing water-miscible organic compounds, or a mixture thereof, said non-oleaginous liquid comprising from about 1 to about 70 percent by volume of said fluid; wherein said non-oleaginous fluid zinc bromide and;
c) a protonated amine having the structure:

$$R-N^{\pm}-H_3B^-$$

wherein R is a $C_{12}$–$C_{22}$ alkenyl group and $B^-$ is the conjugate base of a water soluble acid, said protonated amine comprising from about 0.1 to about 5.0 percent by weight of said fluid.

* * * * *

UNITED STATES PATENT AND TRADEMARK OFFICE
CERTIFICATE OF CORRECTION

PATENT NO. : 5,985,800

DATED : November 16, 1999

INVENTOR(S) : Arvind D. Patel

It is certified that error appears in the above-identified patent and that said Letters Patent is hereby corrected as shown below:

In Col. 14, line 13, after the word "fluid" add --includes--.

Signed and Sealed this

Thirteenth Day of June, 2000

Attest:

Q. TODD DICKINSON

Attesting Officer     *Director of Patents and Trademarks*